(12) United States Patent
Liu et al.

(10) Patent No.: US 6,631,238 B2
(45) Date of Patent: Oct. 7, 2003

(54) VARIABLE OPTICAL ATTENUATOR

(75) Inventors: Hongdu Liu, Fremont, CA (US); Daxin Liu, Mountain View, CA (US); Shizhuo Yin, Fremont, CA (US); Lee Lisheng Huang, Sunnyvale, CA (US)

(73) Assignee: Primanex Corporation, Fremont, CA (US)

( * ) Notice: Subject to any disclaimer, the term of this patent is extended or adjusted under 35 U.S.C. 154(b) by 54 days.

(21) Appl. No.: 09/810,851

(22) Filed: Mar. 16, 2001

(65) Prior Publication Data

US 2002/0131755 A1 Sep. 19, 2002

(51) Int. Cl.[7] .............................. G02B 27/28; G02B 5/30
(52) U.S. Cl. ........................ 385/140; 359/494; 359/497
(58) Field of Search ........................ 385/140; 359/484, 359/485, 494, 497

(56) References Cited

U.S. PATENT DOCUMENTS

| | | | | |
|---|---|---|---|---|
| 5,033,830 A | * | 7/1991 | Jameson | ...................... 359/484 |
| 5,768,005 A | * | 6/1998 | Cheng et al. | ................. 359/281 |
| 5,915,063 A | | 6/1999 | Colbourne et al. | ......... 385/140 |
| 6,246,518 B1 | * | 6/2001 | Chang et al. | ................. 359/483 |
| 6,307,677 B2 | * | 10/2001 | Cao | ............................. 356/519 |
| 2002/0109917 A1 | * | 8/2002 | Sagan et al. | ................. 359/484 |

FOREIGN PATENT DOCUMENTS

JP          6051255          2/1994  ............ G02F/1/09

* cited by examiner

Primary Examiner—David V. Bruce
Assistant Examiner—Krystyna Suchecki (57) ABSTRACT

Randomly polarized light impinges upon a birefringent crystal, is split into orthogonal polarization components and emerges from the crystal separated by a walk-off distance. The light beams then impinge on polarization rotators that cause a rotation of the plane of polarization by +45° and −45°. The light then encounters a variable polarization rotator in which the plane of polarization is rotated through a angle that varies in response to an externally-applied control signal. The maximum operating range (0 to 100% attenuation) is achieved when the variable rotator is capable of rotations in the range ±45°. A second birefringent crystal functions as a beam displacer. The beams encounter two wave plates configured to produce rotation angles of 0° and 90° followed by a retroreflector. The reverse traverse of the attenuator causes the light to emerge at an output port attenuated in intensity.

2 Claims, 7 Drawing Sheets

$\theta_1 + \theta_2 = 90°$

VARIABLE OPTICAL ATTENUATOR

BACKGROUND

1. Technical Field

The present invention relates to variable optical attenuators and, more particularly, to variable optical attenuators based upon polarization rotation having large dynamic range, compact size and fast tuning speed.

2. Description of Related Art

In many applications, including in fiber optics communication network systems, it is often required to adjust the intensity (optical power) of light signals. For example, one factor determining the quality of a signal is the ratio of the intensity of an optical signal to the intensity of the noise in the optical signal, typically referred to as the optical signal-to-noise ratio (optical SNR). Therefore, it is often necessary to adjust the intensity of a light signal to increase the optical SNR such that the optical SNR exceeds a predetermined level. Moreover, the gain of an optical amplifier typically depends on the wavelength of the signal undergoing amplification resulting in the various component wavelengths of an optical signal having different intensities.

A variable optical attenuator (VOA) is typically used to control (that is, reduce) the intensity of selected light signals and thereby to maintain each light signal at substantially the same light intensity. Several types of optical attenuators are known in the art.

One conventional type of optical attenuator is a mechanical type optical attenuator in which attenuation is achieved by mechanically shifting or rotating the position of an incoming light signal. However, due to the relatively slow speed of mechanical motion, these mechanical types of VOAs have limited tuning speed, generally slower than about 1 millisecond (1 ms). Long term reliability of these types of devices is still uncertain.

Rotation of the plane of polarization of an incoming light beam can also be used to fabricate a VOA having the advantage of achieving attenuation without the need for mechanical motion of any component. For example, Japanese laid-open patent application No. 6-51255 entitled "Optical Attenuator" discloses a VOA that includes a magneto-optical crystal, a polarizer, a permanent magnet and an electromagnet. The incoming light signal is linearly polarized by a polarizer. This linearly polarized light is then passed through a magneto-optical crystal. A permanent magnet applies a constant magnetic field to the magneto-optical crystal in a direction parallel to the light path. An electromagnet applies a variable magnetic field in a direction perpendicular to the light path, the strength of this variable magnetic field readily controlled by controlling the current passing through the electromagnet. The composite magnetic field resulting from the vector sum of the constant and variable magnetic fields rotates the plane of polarization of the linearly polarized light as it passes through the magneto-optical crystal. The amount of rotation is controllable by controlling the current through the electromagnet. In other words, a magneto-optical crystal, a permanent magnet and an electromagnet in combination are used to form a Faraday rotator. We note that large optical scattering losses may occur when the magneto-optical crystal has a large number of optical domains. However, when the magnetic field provided by the permanent magnet is larger than the saturation level for the crystal, the composite magnetic field is always greater than the saturation magnetic field (since the variable magnetic field is perpendicular to the permanent field the composite intensity is never smaller than either component field). In this case of magnetic fields greater than saturation, magnetic domains inside the magneto-optical crystal are substantially integrated into a single large domain, which results in substantially reduced optical scattering losses.

The amount by which the plane of polarization is rotated upon passage through a magneto-optical crystal is in accordance with the physical principle known as the "Faraday effect," given by Eq. 1.

$$\phi = V \cdot L \cdot H_\parallel \qquad \text{Eq. 1}$$

where $\phi$ = the rotation angle of the plane of polarization.

L = the path length through the magneto-optical material.

$H_\parallel$ = the magnitude of the component of the magnetic field applied to the magneto-optical crystal in the direction of light propagation.

V = Verdet constant; a constant of proportionality dependent on the particular magneto-optical material.

Figure 1:
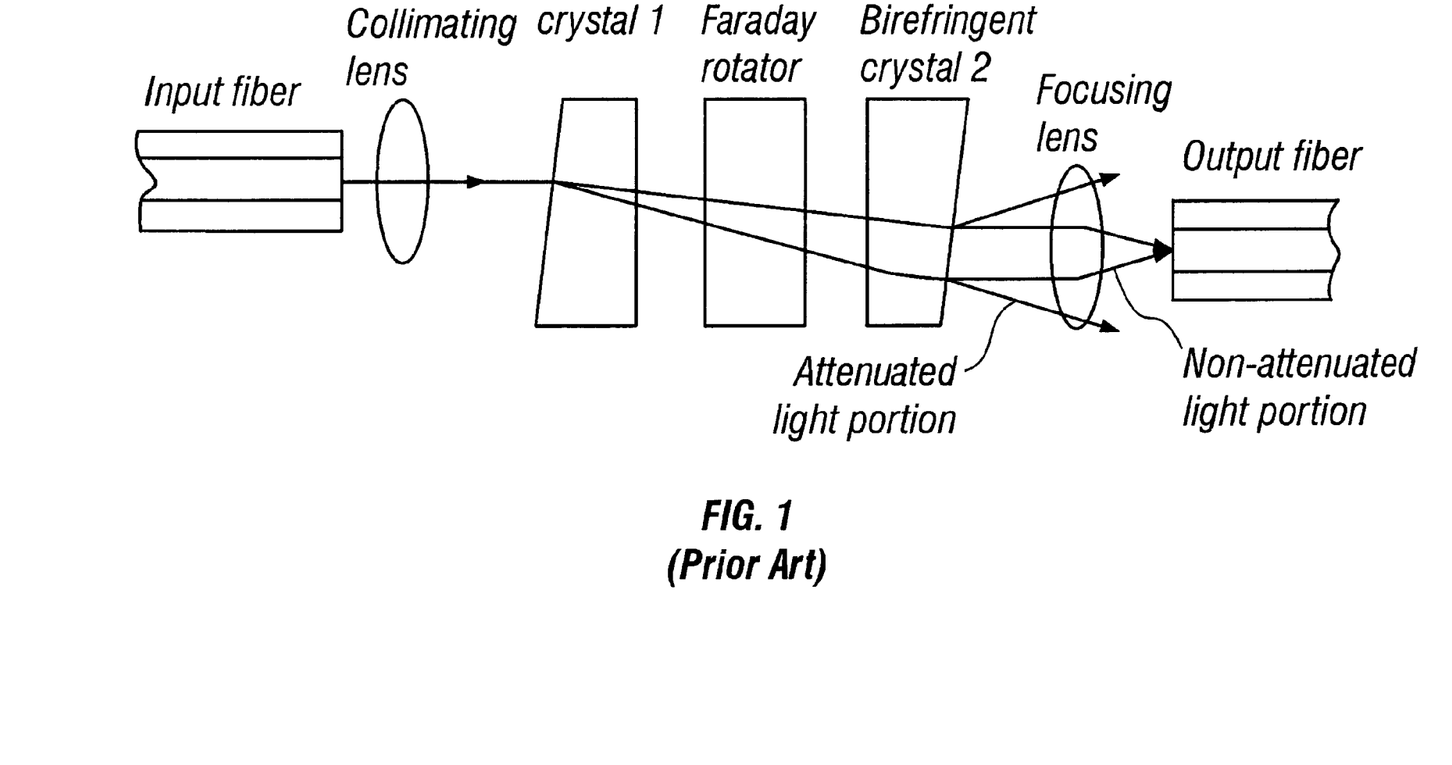
FIG. 1: Schematic depiction of conventional variable optical attenuator

The VOA described above requires linearly polarized light. Light of arbitrary polarization can be attenuated by the technique depicted in FIG. 1 as described in the above-referenced Japanese Laid-Open patent application. Essentially, a birefringent crystal is used to separate randomly polarized incident light into two orthogonal plane polarizations corresponding to the ordinary and extraordinary optical axes of the birefringent crystal. The birefringent crystal physically separates the ordinary and extraordinary beams which then have polarizations rotated by passage through a Faraday rotator. The two rotated light beams emerging from the Faraday rotator are directed into a second birefringent crystal oriented so each of the two incident beams is separated into ordinary and extraordinary beams. A focusing lens following the second birefringent crystal focuses two of the four emerging beams into the output fiber, while the other two beams are lost, resulting in attenuation. The relative orientations of the two birefringent crystals and the rotation caused by the Faraday rotator determines the degree of attenuation.

A disadvantage of the prior art devices is that the dynamic range of attenuation is limited by the extinction ratio of the polarization-sensitive elements, including the birefringent crystals and the Faraday rotator. Since the light beam passes through each polarization-sensitive device only once (FIG. 1), the overall dynamic range is similar to the dynamic range of a single stage isolator; that is about 30 dB.

The present invention achieves an increase in the dynamic range of attenuation without increasing the number of stages by making use of an innovative reflective VOA configuration. The reflective VOA of the present invention greatly increases the dynamic range (typically to about 60 dB) and makes the device more compact, reducing the length of the transmission architecture by about a factor of two. The present VOAs also achieve fast tuning speeds.

SUMMARY

The present invention relates to variable attenuation of an light beam by use of polarization rotators in which the degree of rotation of the polarization is determined by an externally-applied control signal leading to variable attenuation of the light beam under the control of the external signal. Randomly polarized light arrives at input port to the variable optical attenuator ("VOA"). The light encounters a birefringent crystal and is split into orthogonal polarization components. Passage of the light through the birefringent crystal causes separation of the extraordinary beam from the ordinary beam by a walk-off distance L upon emerging from the birefringent crystal.

The light beams emerging from the birefringent crystal then impinge on the surface of wave plates (polarization rotators) that are configured to cause a rotation of the plane of polarization by +45° and −45° rotation. Both light beams then impact a variable polarization rotator in which the plane of polarization is rotated through a angle that can be varied in response to an externally-applied control signal. The maximum operating range (0 to 100% attenuation) is achieved when the variable rotator is capable of rotations in the range ±45°. However, a lesser range of attenuation is achievable with a lesser range of polarization rotation making use of the VOA of the present invention.

Following passage through the variable polarization rotator, the light beams then encounter a second birefringent crystal that has its crystal axis within the horizontal (x, y) plane used as a beam displacer. The beams next encounter two wave plates configured to produce rotation angles of 0° and 90° respectively. The beams next strike a retroreflector that interchanges the vertical positions of the beams incident thereon. The returning light beams next encounter wave plates in the reverse direction followed by a reverse traverse through the second birefringent crystal that causes a rotation in the same sense and magnitude as on the forward traverse. The beams next encounter the variable polarization rotator, wave plates and first birefringent crystal in the reverse direction.

Attenuation between 0 and 100% is achieved by causing the variable polarization rotator to rotate the plane of polarization between −45° and +45°, typically by altering the magnetic field applied to the rotator.

BRIEF DESCRIPTION OF THE DRAWINGS

The drawings herein are not to scale.

FIG. 3: (A) Schematic depiction of variable optical attenuator pursuant to some embodiments of the present invention. (B) Position-polarization diagram of attenuator of FIG. 3A operating in the mode of zero attenuation.

FIG. 5: (A) Schematic depiction of variable optical attenuator as in FIG. 3A. (B) Position-polarization diagram of attenuator of FIG. 5A operating in the mode of maximum (complete) attenuation.

FIG. 7: (A) Schematic depiction of variable optical attenuator pursuant to other embodiments of the present invention. (B) Position-polarization diagram of attenuator of FIG. 7A operating in the mode of zero attenuation.

FIG. 10: (A) Schematic depiction of variable optical attenuator as in FIG. 7A. (B) Position-polarization diagram of attenuator of FIG. 7A operating in the mode of maximum (complete) attenuation.

DETAILED DESCRIPTION

The present invention relates to a variable optical attenuator ("VOA") based upon rotation of the plane of polarization under the control of an external control signal. In some embodiments, the polarization rotator is a tunable Faraday rotator in which the angle of rotation of the plane of polarization can be tuned by the application of an external magnetic field, typically through an electromagnetic coil. Other polarization rotators can also be employed in connection with the present invention including, but not limited to, liquid crystal rotators in which the degree of rotation is controllable by the application of an external electric field. Thus, the present invention makes use of polarization rotators in which the degree of rotation of the polarization is determined by an externally-applied control signal leading to variable attenuation under the control of the external signal.

The VOA is interposed between a source of light arriving at the VOA at an input port and the light continuing its journey at an output port. The VOA permits a fraction, α, of the input light intensity $I_{in}$ to reach the output port under the control of an externally-applied signal, s as $$I_{out}(s)=\alpha(s)I_{in}, \text{ where } 0 \leq \alpha \leq 1 \qquad \text{Eq. 2.}$$

Figure 2:
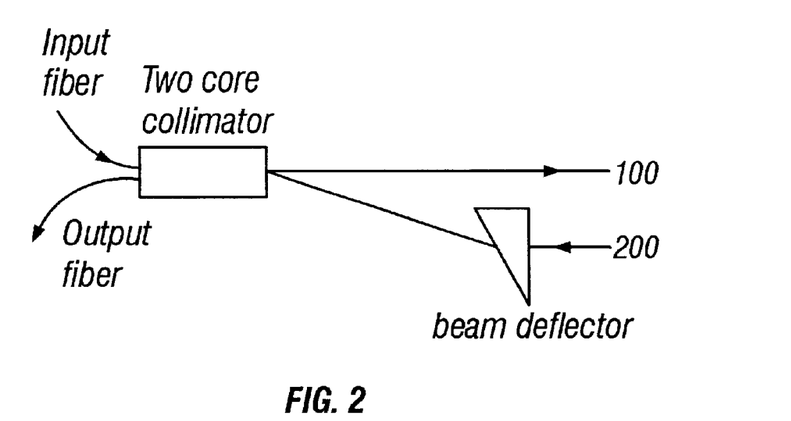
FIG. 2: Schematic depiction of two core collimator and beam deflector

FIG. 2 depicts one configuration of a two core collimator plus a beam deflector. In this configuration, either beam can serve as the input (or output) beam. In addition, the beam deflector can have different locations with respect to the VOA system. Although a prism is shown as the beam deflector in FIG. 2, other optical components can also be used, including but not limited to a rotating mirror and other components. To simplify the description of the VOA, we make use of port 100 as the input port and port 200 as the output port, understanding that they can be interchanged within the scope of the present invention.

Figure 3A:
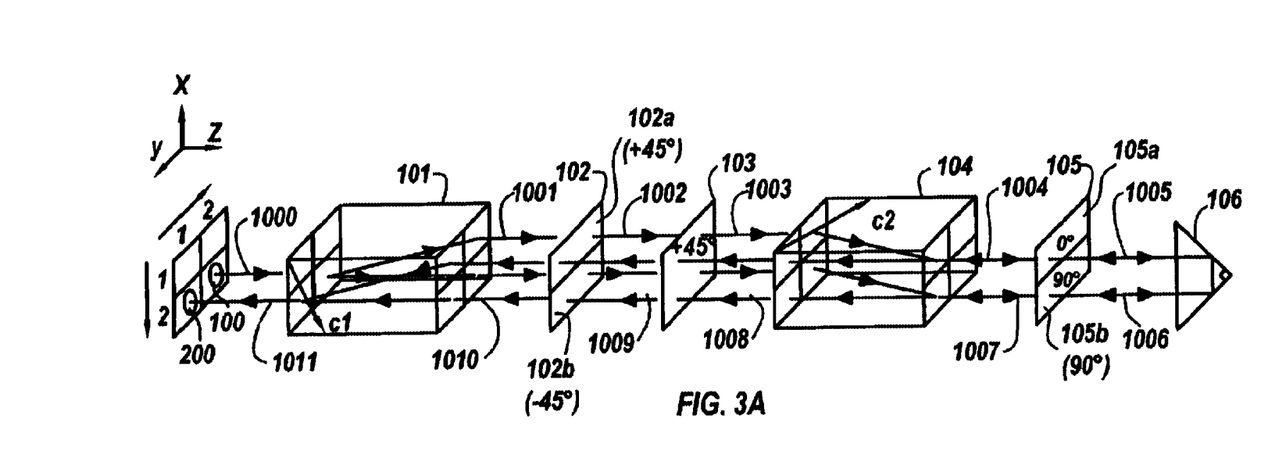

FIG. 3A depicts a schematic view of components of a VOA pursuant to some embodiments of the present invention and the path of light through the VOA from input port 100 to output port 200. We use the coordinate system depicted in FIG. 3A such that the light traverses the VOA in the z direction (+or −z), while the (x, y) plane is perpendicular to the plane of light travel. Depictions in the (x, y) plane thus provide a cross-sectional diagram of the characteristics of the switch at various z-positions.

Figure 3B:
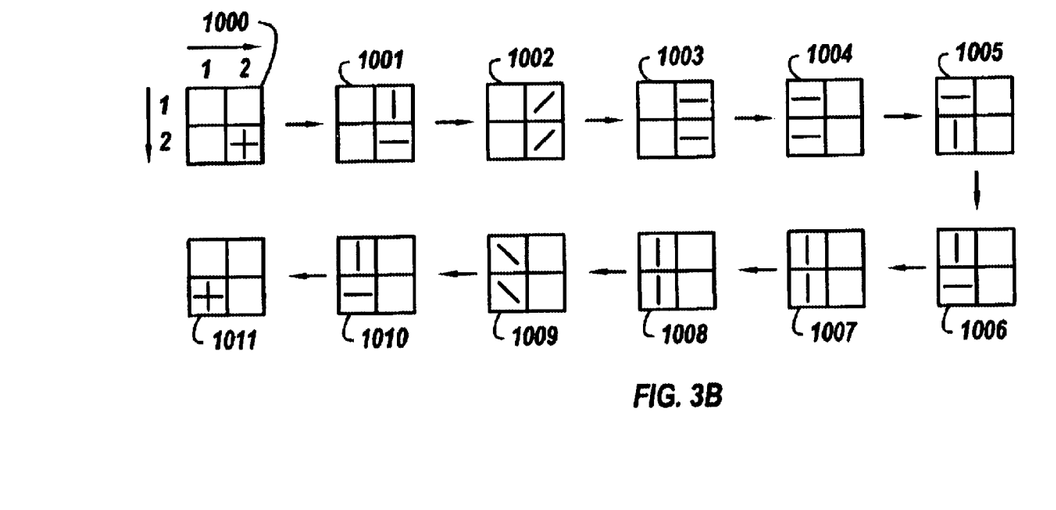

FIG. 3B depicts the position of the light beam at various locations within the switch and the condition of polarization of the light beam (or beams) at that location, that is, "position-polarization diagrams." We follow the convention that the position-polarization diagrams are viewed as if traveling along with the light beam; that is, viewed in the direction of +z for light traversing the VOA in the forward, positive direction (from input 100 to reflector 106) and viewed in the direction of −z for light traversing the VOA in the reverse, negative direction (from reflector 106 to output 200).

Randomly polarized light arrives at input port 100 that is also designated by the (row, column) location (2, 2) in the position-polarization diagram 1000. The light encounters birefringent crystal 101 and is split into orthogonal polarization components. Crystal 101 has its crystal axis within the (x, z) plane. Passage of the light through crystal 101 causes separation of the beams by a walk-off distance L. Crystal 101 is configured such that the ordinary (horizontal) polarization leaves crystal 101 in port (2, 2) while the walk-off causes the extraordinary (vertical) polarization to exit at port (1, 2) as depicted in 1001. Typical birefringent crystals include $YVO_4$, lithium niobate, calcite, rutile, among others.

The light beams emerging from crystal 101 then impinge on the left surface of wave plates 102 (polarization rotators), the upper beam (1, 2) striking 102A and the lower beam (2, 2) striking 102B, the effect of which is to 102A is configured to cause a rotation in the plane of polarization by +45° (clockwise) when viewed along the direction of light travel, that is from left to right. 102B is configured to cause a −45° rotation. The resulting position-polarization diagram is given in 1002.

Both beams impact the variable polarization rotator 103, in which the plane of polarization is rotated through a angle that can be varied in response to an externally-applied control signal. For economy of language, we denote the variable polarization rotators used herein as Faraday rotators, recognizing that other devices may be employed, including but not limited to liquid crystal rotators. Examples of magneto-optic materials that can be used in Faraday rotators include, but are not limited to, single crystal garnet, yttrium-iron-garnet, terbium-gallium-garnet, terbium-aluminum-garnet, among others.

The Faraday rotator 103 pursuant to some embodiments of the present invention is configured so as to be able to rotate the plane of polarization of light incident thereon from +45° to −45° under the control of an external control signal. A magneto-optical material 103, will have an external magnetic field applied thereto, typically by means of passing current through an electromagnetic coil. By varying the current passing through the coil, the rotation of the plane of polarization can be varied according to Eq. 1. The range of optical attenuation that can be achieved with the present VOA is determined by the range of angles through which the polarization can be rotated by Faraday rotator, 103. The maximum operating range (0 to 100% attenuation) is achieved when rotator 103 is capable of rotations in the range ±45°. However, a lesser range of attenuation is achievable with a less range of polarization rotation making use of the VOA of the present invention.

In some cases it may be convenient to use a constant magnetic field applied to the Faraday rotator along with a variable field superimposed thereon by means of an electromagnetic coil carrying the control current. In other cases, it may be convenient to use more than one electromagnetic coil to carry the control current. The overall polarization rotation results from the vector sum of all applied fields. Any combination of externally applied fields causing the Faraday rotator to induce polarization rotation in the desired range may be used in the present invention.

One example of variable attenuation achievable with the present invention is zero attenuation. By way of illustration and not limitation we describe the zero-attenuation case to indicate the detailed operation of the VOA.

In this case, the Faraday rotator 103 is configured so as to cause a rotation of +45° (clockwise). The position-polarization of 1003 is the result. The light beams then encounter birefringent crystal 104 that has its crystal axis within the horizontal (x, y) plane used as a beam displacer. The polarization direction of both incident beams corresponds to the extraordinary beam polarization direction. Hence, both beams in passing through 104 experience a lateral walk-off by distance L, where L is arranged to be the distance placing the displaced beams in ports (1, 1) and (2, 1) as depicted in 1004.

Figure 4:
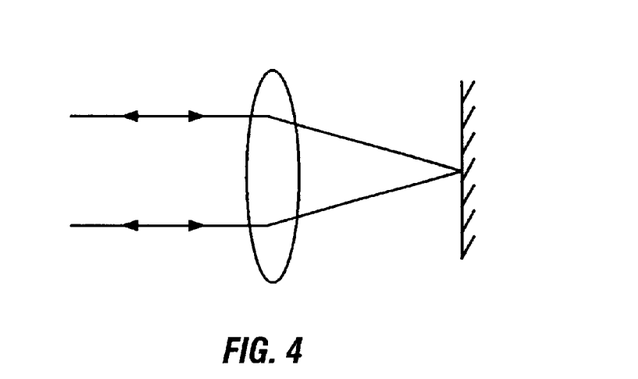
FIG. 4: Schematic depiction of retroreflector constructed from lens and mirror.
Figure 8:
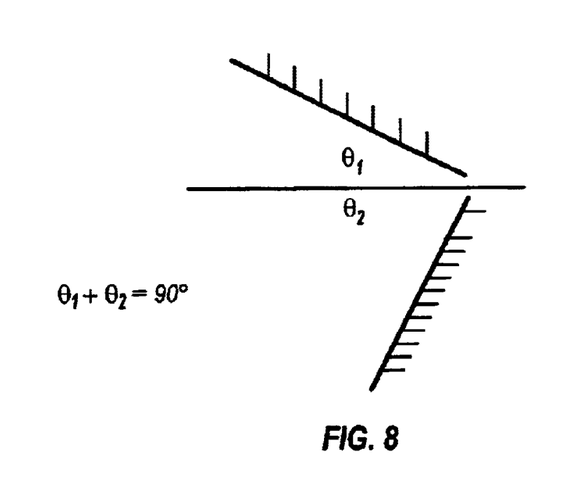
FIG. 8: Schematic depiction of retroreflector based on combination of two mirrors.
Figure 9A:
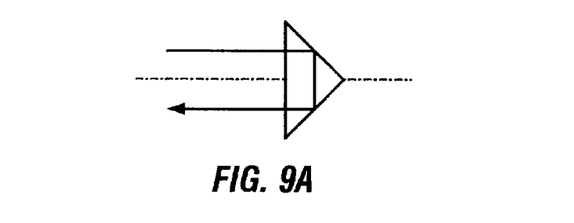
FIG. 9: Schematic depiction of various retroreflectors.
Figure 9B:
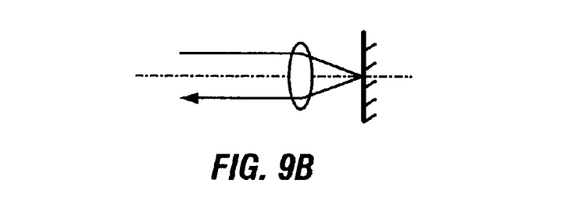
Figure 9C:
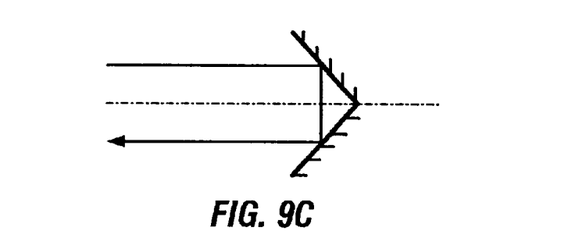
Figure 9D:
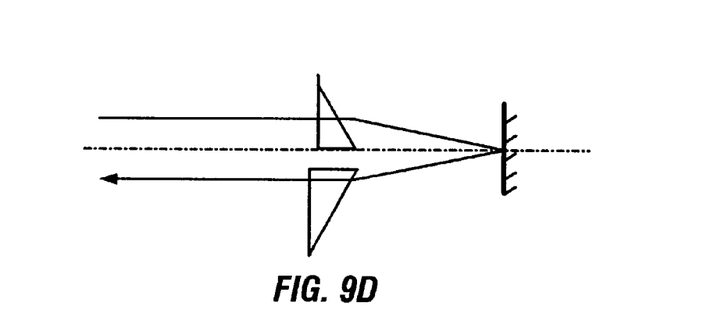
Figure 9E:
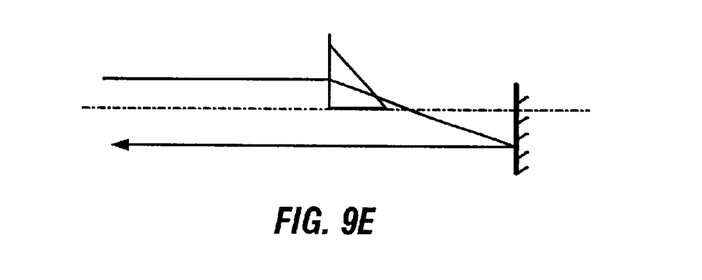

The beams next encounter wave plates 105A and 105B configured to produce rotation angles of 0° and 90° respectively. Note that a 0° wave plate need not be a physical component but may typically be included for mechanical and structural stability in element 105. The result of passage through plate 105 is depicted in 1005. The beams next strike retroreflector 106 that can be a right angle prism (as shown in FIG. 3), a combination of a focusing lens plus a reflection mirror (FIG. 4), or other retroreflecting devices making use of mirrors, lenses, prisms among other elements. Several embodiments are depicted in FIGS. 8 and 9 by way of illustration, not limitation.

The retroreflector 106 interchanges row 1 and row 2 in the position-polarization diagram, leading to the return light beam following retroreflection as depicted in 1006.

The returning light beams now encounter wave plates 105 in the reverse direction, resulting in the position-polarization depicted in 1007. The (1, 1), (2, 1) beams depicted in 1007 now encounter birefringent crystal 1004 with both polarizations along the ordinary crystal direction, passing through 104 unchanged (1008).

Returning light beams encountering Faraday rotator 103 experience a rotation in the same sense and magnitude as on the forward traverse as described in standard references (for example, *Fundamentals of Photonics* by B. E. A. Saleh and M. C. Teich, (Wiley & Sons, 1991), P. 226); that is negative (counterclockwise) when viewed along the direction of the light beam (now travelling in the −z direction). The position-polarization of 1009 is the result.

The beams depicted in 1009 now encounter wave plates 102, beam (1, 1) striking 102A and beam (2, 1) striking 102B. The position-polarizations emerging from 102 are depicted in 1010. Encountering birefringent crystal 101 causes the extraordinary beam (1, 1) to walk-off by distance L, emerging from 101 recombined with (2, 1) as the beam in port (1, 2). Aside from incidental losses in intensity in the passage through the switch by absorption, reflection, scattering and other effects, the light emerging at exit port 200 (beam (1, 2)) is undiminished in intensity from the incident beam in port 100 (beam (2, 1)).

Variation in the attenuation is achieved by causing an applied magnetic field to be applied to Faraday rotator 103 so as to rotate the polarization by less than +45°. To provide a concrete illustration, we consider the opposite limiting case of full attenuation (no light emerges at port 200) achieved by setting rotator 103 to rotate the plane of polarization by −45°.

Figure 5A:
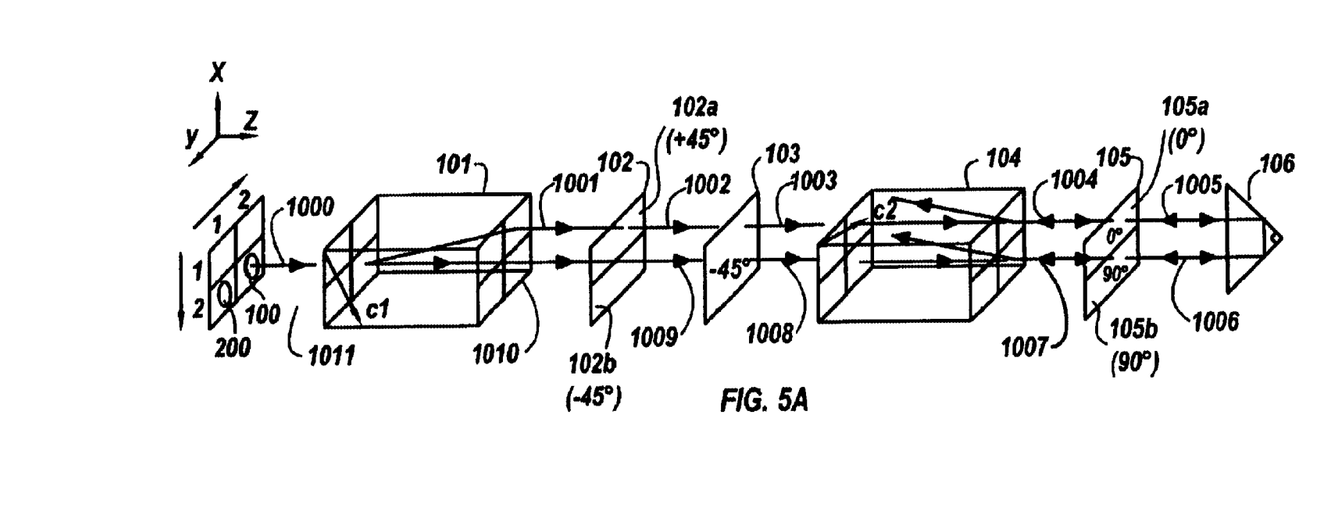
Figure 5B:
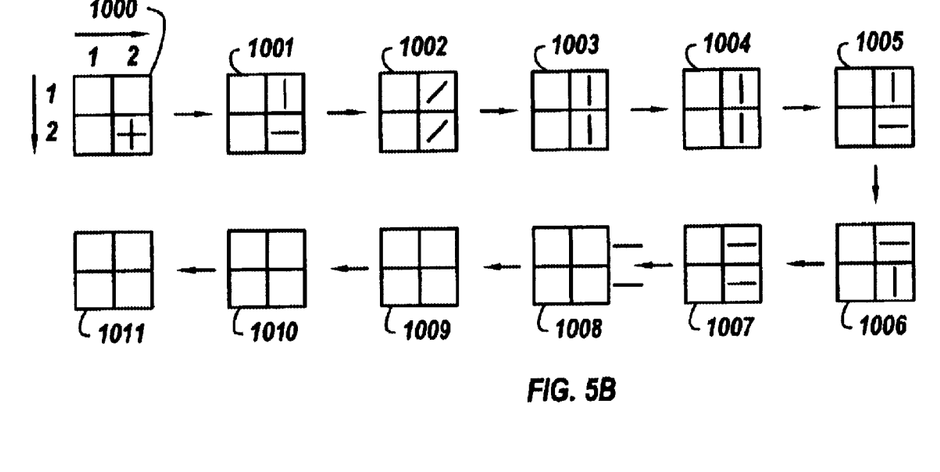

Referring to FIGS. 5A and 5B, randomly polarized light arrives at input port 100 (2, 2) in the position-polarization diagram 1000. The light encounters birefringent crystal 101 and is split into orthogonal polarization components. Crystal 101 has its crystal axis within the (x, z) plane. Passage of the light through crystal 101 causes separation of the beams by a walk-off distance L. Crystal 101 is configured such that the ordinary (horizontal) polarization leave crystal 101 in port (2, 2) while the walk-off causes the extraordinary (vertical) polarization to exit at port (1, 2) as depicted in 1001. The light beams then impinge on the left surface of wave plates 102 configured to cause a rotation in the plane of polarization by +45° (clockwise) for beam (1, 2) when viewed along the direction of light travel, that is from left to right. 102B is configured to cause a −45° rotation. The resulting position-polarization diagram is given in 1002.

Both beams impact Faraday rotator 103 configured (in this example) so as to rotate the plane of polarization of light incident thereon from the left by −45°. The position-polarization of 1003 is the result.

The light beams then encounter birefringent crystal 104 that has its crystal axis within the horizontal (x, y) plane. Since the polarization direction of both incident beams corresponds to the ordinary beam polarization direction, both beams pass through 104 undeflected.

The beams next encounter wave plates 105A and 105B configured to produce rotation angles of 0° and 90° respectively. The result of passage through plate 105 is depicted in 1005. The beams next strike retroreflector 106 that interchanges row 1 and row 2 in the position-polarization diagram, leading to the return light beam following retroreflection as depicted in 1006.

The returning light beams now encounter wave plates 105 in the reverse direction, resulting in the position-polarization depicted in 1007. The (1, 2), (2, 2) beams depicted in 1007 now encounter birefringent crystal 1004 with both polarizations along the extraordinary crystal direction, passing through 104 with a lateral walk-off that removes both beams from the optical path, 1008. Having been lost from the optical path on the reverse traverse of VOA, no light reaches port 200 (1008→1009→1010→1011).

Figure 6:
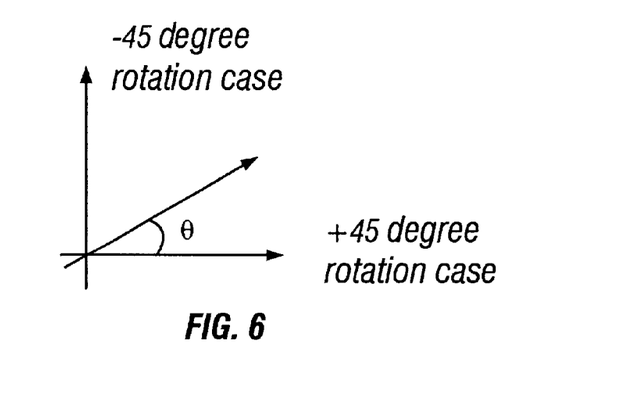
FIG. 6: Depiction of θ determining degree of attenuation according to Eq. 3.

Attenuation between 0 and 100% is achieved by configuring Faraday rotator to rotate the plane of polarization between −45° and +45°, typically by altering the magnetic field applied to the rotator. Defining as the difference between the actual Faraday rotation angle $\phi$ in the range [−45° to +45°] and the rotation angle for 0 attenuation (that is, +45°, see FIG. 6))

$$\theta = 45° - \phi, \text{ where } |\phi| \leq 45° \qquad \text{Eq. 3.}$$

According to physical Malus's Law, the output light intensity, $I_{out}$, is reduced from the input light intensity $I_{in}$, by a factor of $\cos^2\phi$.

$$I_{out}(\theta) = I_{in} \cos^2\theta \qquad \text{Eq. 4.}$$

(See, for example, *Fundamentals of Optics*, 4$^{th}$ Ed., by F. A. Jenkins and H. E. White (McGraw-Hill, 1976), pp. 503–504). Thus, any attenuation level can be achieved by controlling the magnetic field applied to the Faraday rotator. Replacing the Faraday rotator by another type of variable polarization rotator makes no essential difference in the analysis or the operation of the VOA.

The VOA depicted herein makes use of a folded light path, causing the beams to pass twice through each optical component (unless fully attenuated and not reaching some components). The resulting VOA effectively doubles the achievable dynamic range without increasing the physical size.

Figure 7A:
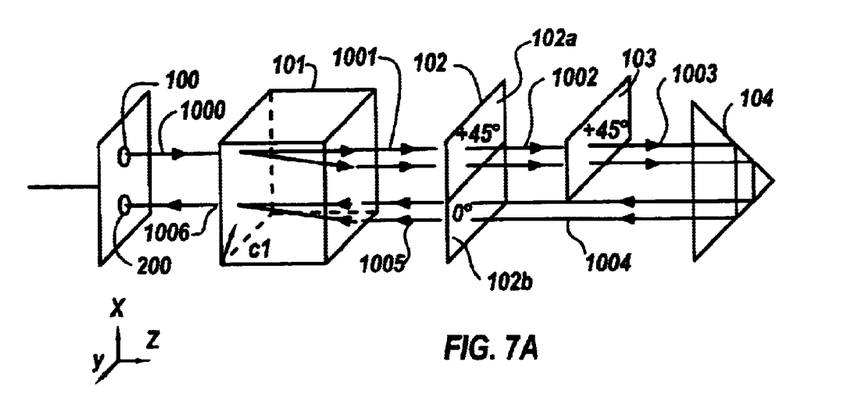
Figure 7B:
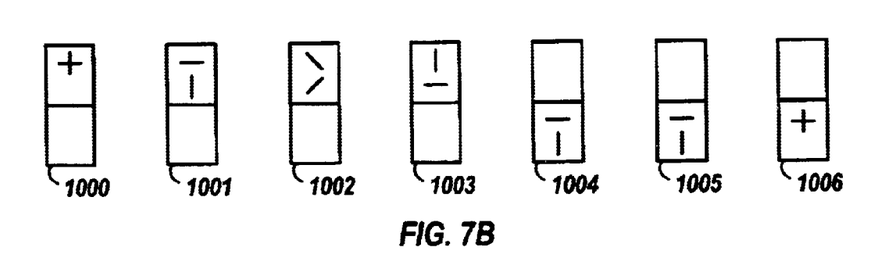

FIG. 7 depicts a schematic diagram of another embodiment of the VOA (FIG. 7A) and the associate position-polarization diagram (FIG. 7B). We depict in FIG. 7 the case of zero attenuation understanding that other levels of attenuation can be achieved pursuant to Eq. 4 by means of different amounts of polarization-rotation from that depicted in FIG. 7B. Sign and direction conventions are the same as those employed above.

Randomly polarized light incident at port 100 (depicted in position-polarization diagram 100) is separated into ordinary (horizontal) polarization and extraordinary (vertical polarization) by birefringent crystal 101. The extraordinary beam walks-off by a distance L approximately a third of the distance from input port 100 to output port 200. Both beams strike wave plate 102A from the left. 102A is configured to rotate the plane of polarization by +45°, giving the position-polarizations of 1002.

The beams then encounter Faraday rotator (or other polarization rotating element), in which the rotation of the plane of polarization is controlled by an external control signal, a magnetic field in the case of Faraday rotation. For the illustrative case depicted in FIG. 7, the rotation caused by rotator 103 is +45°, resulting in position-polarization 1003.

A retroreflector 104 causes the beams to reverse direction and also to reflect (x, y) coordinates in the center line of the device, as depicted in 1003→1004. Element 102B causes no change in the beams (1005). The rotator 103 is missed by the beams on their reverse traverse of the VOA. The beams are recombined by 101 to exit from the VOA at port 200.

Figure 10A:
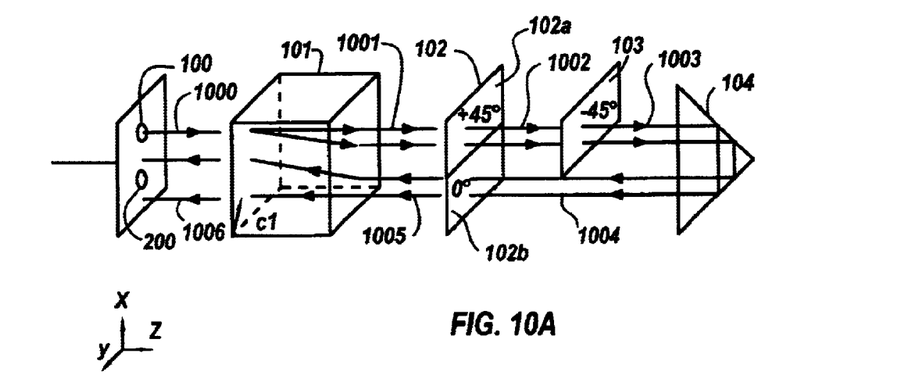
Figure 10B:
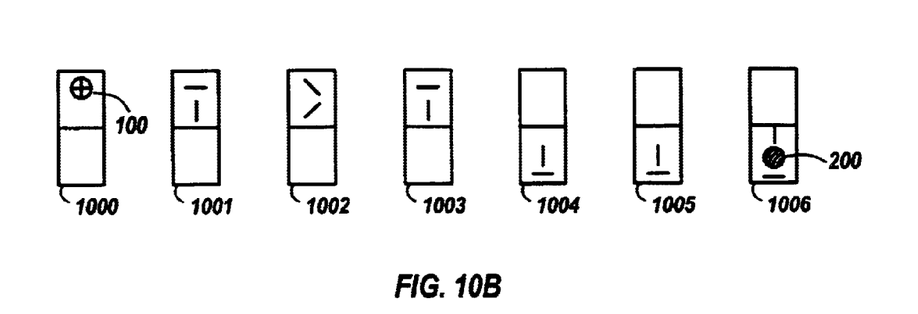

The case of complete attenuation is obtained with rotator 103 set −45° as depicted in FIG. 10. The position-polarization diagrams can be traced through the VOA as in FIG. 7, differing only in that the vertical and horizontal polarizations are interchanged in 1003, 1004 and 1005. Upon encountering crystal 101 in the −z direction, the horizontal polarization of 1005 is displaced out of the optical path while the vertical polarization passes through 101 undeflected. As depicted in 1006, neither polarization encounters port 200, leading to complete attenuation.

Attenuation between zero and 100% is obtained with polarization rotations between 45° and +45° pursuant to Eqs. 3, 4 and FIG. 6.

Having described the invention in detail, those skilled in the art will appreciate that, given the present disclosure, modifications may be made to the invention without departing from the spirit of the inventive concept described herein. Therefore, it is not intended that the scope of the invention be limited to the specific and preferred embodiments illustrated and described.

We claim:

1. A variable optical attenuator comprising:

a) a light input port having a configuration to deliver input light to a first end of a birefringent crystal, wherein said birefringent crystal has a structure and orientation to separate said input light into a first ordinary beam and a first extraordinary beam and cause said first ordinary beam and said first extraordinary beam to emerge from the opposite second end of said first birefringent crystal separated by a walk-off distance; and, b) a half-wave plate located such that said half-wave plate intersects said first ordinary beam and said first extraordinary beam, wherein said half-wave plate has a structure and orientation so as to rotate the plane of polarization of said beams by 45°; and, c) a variable polarization rotator located so as to intersect said first ordinary beam and said first extraordinary beam following said half-wave plate, wherein said variable polarization rotator rotates the plane of polarization by an angle in the range from greater or equal to −45° to less than or equal to +45° in response to an externally applied control signal; and, d) a retroreflector having a structure and orientation so as to return said first extraordinary beam onto said second end of said birefringent crystal as a second extraordinary beam, and to return said first ordinary beam onto said second end of said birefringent crystal as a second ordinary beam, wherein said second ordinary beam and said second extraordinary beam impinge on said second face of said birefringent crystal separated by said walk-off distance and wherein said second ordinary beam and said second extraordinary beam emerge from said first end of said birefringent crystal recombined to a variable extent determined by said externally-applied control signal applied to said variable polarization rotator.

2. A variable optical attenuator comprising:

a) a light input port having a configuration to deliver input light to a first end of a first birefringent crystal, wherein said first birefringent crystal has a structure and orientation to separate said input light into a first ordinary beam and a first extraordinary beam and cause said first ordinary beam and said first extraordinary beam to emerge from the opposite second end of said first birefringent crystal separated by a walk-off distance; and, b) a first half-wave plate and a second half-wave plate located such that said first half-wave plate intersects said first ordinary beam and said second half-wave plate intersects said first extraordinary beam, wherein said first half-wave plate has a structure and orientation so as to rotate the plane of polarization of said first ordinary beam by −45° and said second half-wave plate has a structure and configuration so as to rotate the plane of polarization of said first extraordinary beam by 45°; and, c) a variable polarization rotator located so as to intersect said first ordinary beam and said first extraordinary beam following said half-wave plate, wherein said variable polarization rotator has the capability under the control of an externally-applied control signal to rotate the plane of polarization by an angle in the range from greater or equal to −45° to less than or equal to +45°; and, d) a second birefringent crystal located so as to intersect said first ordinary beam and said first extraordinary beam at a first end thereof following said variable polarization rotator wherein said second birefringent crystal has a structure and orientation to displace said first ordinary beam and said first extraordinary beam by a displacement determined by said externally-applied control signal; and, e) a retroreflector having a structure and orientation so as to return said first extraordinary beam through a 90° half-wave plate and onto the second end of said second birefringent crystal as a second extraordinary beam, and to return said first ordinary beam through the 90° half-wave plate and onto said second end of said second birefringent crystal as a second ordinary beam, wherein said second birefringent crystal has a structure and orientation such that said second ordinary beam and said second extraordinary beam emerge from said first end of said second birefringent crystal, then encounter said variable polarization rotator then encounter said first and second half-wave plates in the opposite sense from that of said first ordinary and extraordinary beams, then encounter said second end of said first birefringent crystal, emerging recombined from the first end of said first birefringent crystal where the intensity of the recombined beam is determined by said externally applied control signal, wherein said 90° wave plate has a structure and orientation so as to rotate the plane of polarization of said first extraordinary beam and said first ordinary beam by 90°.

* * * * *